United States Patent [19]
Perry et al.

[11] Patent Number: 5,509,724
[45] Date of Patent: Apr. 23, 1996

[54] MULTIPLE AXLE QUARTER FRAME END DUMP TRAILER

[75] Inventors: John W. Perry, Reston, Va.; Steven F. Retzloff; Jason R. Backs, both of Houston, Tex.

[73] Assignee: Travis Body & Trailer, Inc., Houston, Tex.

[21] Appl. No.: 235,884

[22] Filed: May 2, 1994

[51] Int. Cl.⁶ .................................................. B60P 1/18
[52] U.S. Cl. ................................ 298/22 D; 298/22 AE
[58] Field of Search ........................... 298/22 D, 22 F, 298/22 AE, 22 R, 17 R

[56] References Cited

U.S. PATENT DOCUMENTS

| 2,861,837 | 11/1958 | Morse | 298/22 AE |
|---|---|---|---|
| 2,988,399 | 6/1961 | Wood | 298/22 AE |
| 3,630,571 | 12/1971 | Saldana. | |
| 4,084,851 | 4/1978 | Duncan, Sr.. | |
| 4,883,321 | 11/1989 | Voigt. | |
| 5,184,872 | 2/1993 | Larochelle et al. | 298/22 AE |

FOREIGN PATENT DOCUMENTS 1586936  8/1990  U.S.S.R. .

OTHER PUBLICATIONS

Larochelle, "Leaders in Quality Dump Trucks", Feb. 1988, 4 pages.

Primary Examiner—William E. Terrell
Assistant Examiner—Gregory A. Morse
Attorney, Agent, or Firm—Howard L. Rose

[57] ABSTRACT

A quarter frame end dump trailer has one or more resilient members placed in its drag link in order to permit the use of an air ride suspension in a tandem axle, spread axle or other multiple axle configuration.

7 Claims, 2 Drawing Sheets

MULTIPLE AXLE QUARTER FRAME END DUMP TRAILER

The present invention relates to multiple axle quarter frame end dump trailers and more particularly to such a trailer having an air ride suspension.

BACKGROUND OF THE INVENTION

There are three basic types of end dump trailers, frameless, full frame and quarter frame. On a frameless dump trailer, the suspension and wheels are rigidly connected to the body so that when it dumps only the rearmost wheels stay on the ground and the trailer body rotates about the point where the tires contact the ground. As a result, the rear end of the trailer drops down during dumping. On a full frame dump trailer, there is a long frame that spans the entire length of the trailer from the coupler plate in front (where the trailer is linked to a truck) to the rear hinge (where the trailer body is connected to the frame). This frame remains horizontal and connected to the truck during dumping while a hydraulic cylinder lifts the front of the trailer body. As a result, all of the tires remain in contact with the ground throughout the entire dump cycle and the rear end of the trailer does not drop down. On a quarter frame dump trailer, there is a partial frame that extends from the rear hinge (where the trailer body is connected to the frame) to slightly forward of the front axle of the trailer. A mechanical linkage is utilized to hold down the front end of this frame which would otherwise rise upward due to instability caused by the weight of the trailer body and payload acting eccentrically to the supports for the frame. As a result, a quarter frame trailer is able to dump similarly to a full frame trailer where all wheels maintain contact with the ground and the rear end does not drop down.

Of these three basic types of end dump trailer, the frameless, the full frame and the quarter frame, only with the quarter frame is it impractical to use an air ride suspension.

In most attempts to use air ride suspensions on quarter frame trailers, because of imperfections in the physical geometry of the quarter frame linkage, the magnitude of the forces generated in the various components is so great that for said components to safely resist these forces, the components' size and weight are sufficiently large as to effectively preclude their use.

In some applications, the quarter frame trailer has certain advantages over either full frame or frameless trailers. When compared to a full frame trailer with an equal length hydraulic cylinder, a quarter frame trailer provides a higher dumping angle and a fairly significant weight advantage, thereby allowing it to carry a greater payload and remain in compliance with highway load limits. When compared to a frameless trailer, a quarter frame trailer provides equal or better stability while dumping and the rear end of the trailer does not drop down during the dumping process. Because of these advantages and the fact that a majority of customers prefer an air ride suspension to a spring suspension, it is extremely desirable to provide a quarter frame trailer with an air ride suspension.

OBJECTS OF THE PRESENT INVENTION

It is an object of the present invention to provide a quarter frame end dump trailer that permits the use of an air ride suspension mechanism while preserving all of the attributes of the conventional quarter frame trailer.

It is another object of the present invention to provide a quarter frame end dump trailer with an air ride suspension in which the forces produced when the trailer ascends to the dump position are sufficiently small that they can be safely resisted with component members of a practical size and weight.

Still another object of the present invention is to modify a quarter frame end dump trailer to permit use of an air ride suspension without increasing the weight, reducing the load carrying capacity or requiring a reduction in length of the trailer.

It is yet another object of the present invention to permit the use of multiple axle arrangements with quarter frame end dump trailers having air ride suspensions.

It is still another object of the present invention to ensure an essentially level subframe while dumping a quarter frame end dump trailer as a result of the use of resilient member(s) in the drag link.

BRIEF DESCRIPTION OF THE PRESENT INVENTION

The quarter frame end dump trailer of the present invention consists of: a trailer body; a hydraulic cylinder for raising the trailer body; a draft arm assembly connected between the approximate center of the trailer body and the lower end of the hydraulic cylinder (to stabilize the trailer body during dumping); a subframe to which the trailer body is hinged at the rear and to which the suspension, axles and wheels are mounted; and a drag link (which holds down the forward end of the frame during dumping) extending between an approximate mid-region of the draft arm assembly and the forward end of the subframe. The drag link is composed of two telescoping sections coupled with a resilient member which allows controlled axial displacement in the drag link and thereby reduces the magnitude of the forces produced in the draft arm assembly, drag link and subframe.

The underlying problem to be solved by the use of a resilient member is: on a quarter frame trailer with a rigid drag link, the end of the drag link that is connected to the draft arm assembly attempts to move along a path described by an arc about the hinge where it is connected to the subframe, while the point on the draft arm assembly where the drag link connects attempts to move on a more complex path that is defined by the rotation of the draft arm assembly about its pinned connection to the trailer body and the rotation of the trailer body about its pinned connection to the subframe.

The resilient section is preferably a strong coil spring but other types of resilient members may be employed such as a flexure spring, air spring (bag) or other resilient member. The particular spring used in the present preferred embodiment of the invention has a spring constant of approximately 6000 lbs./in. for a 37 foot trailer.

The above and other features, objects and advantages of the present invention, together with the best means contemplated by the inventor thereof for carrying out the invention will become more apparent from reading the following description of a preferred embodiment and perusing the associated drawings in which:

DETAILED DESCRIPTION OF THE PRESENT INVENTION

Figure 1:
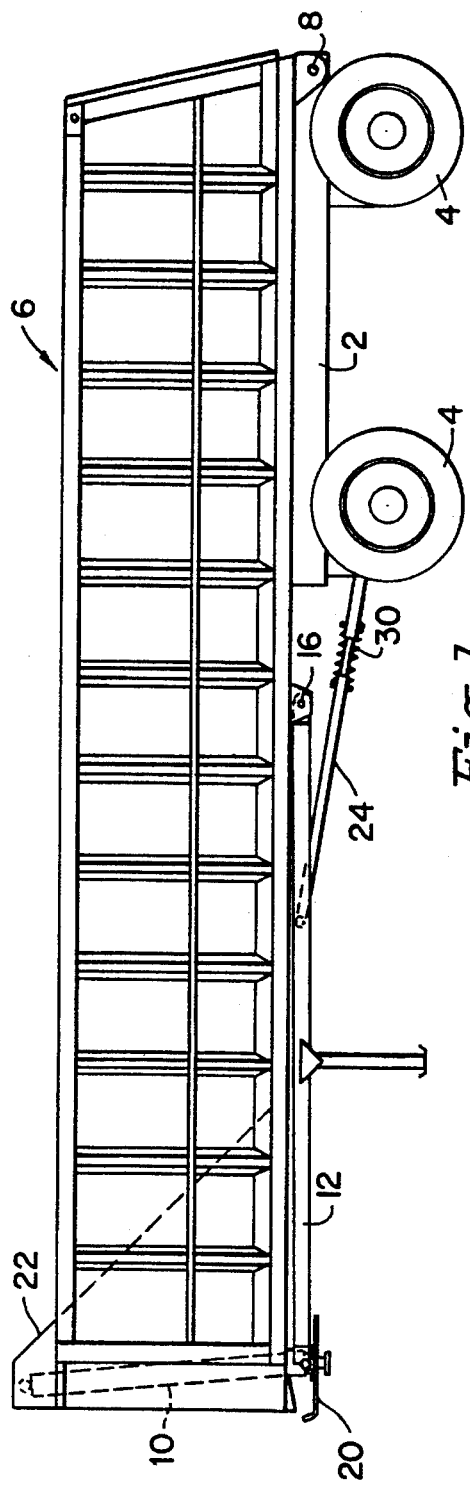
FIG. 1 is a side view in elevation of the quarter frame end dump trailer of the present invention in the down position.
Figure 3:
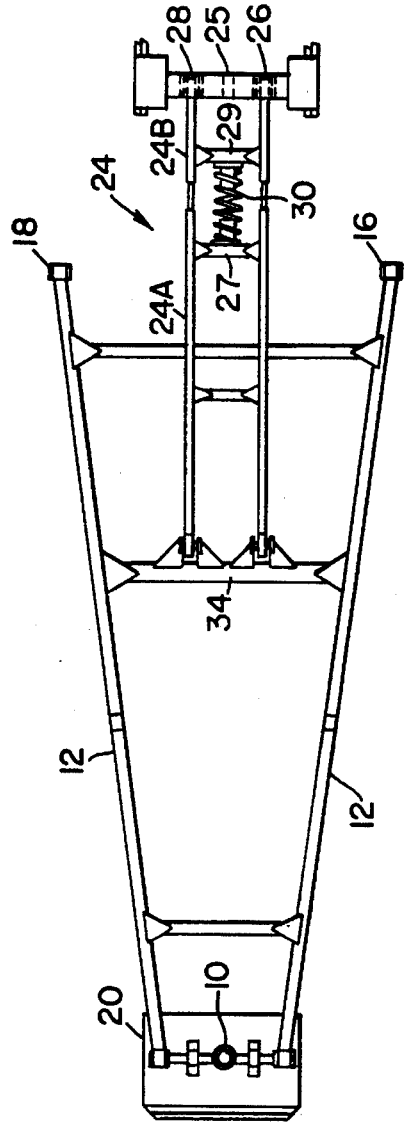
FIG. 3 is a plan view of the linkages of the quarter frame end dump trailer of the present invention in the dump position.
Figure 4:
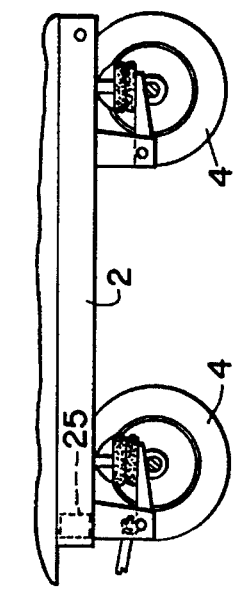
FIG. 4 is a side view of the subframe illustrating the placement of the air ride members on the subframe.
Figure 2:
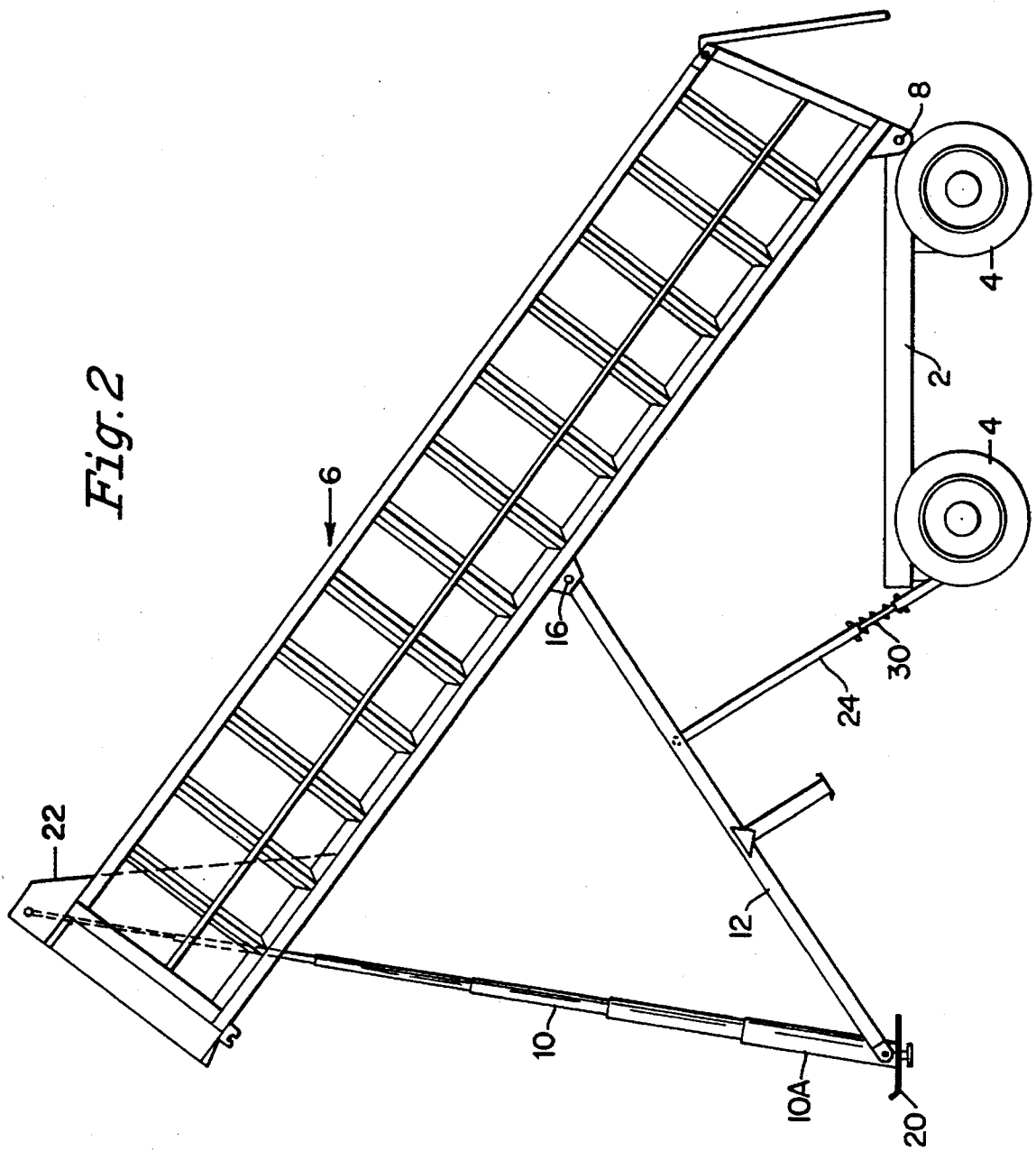
FIG. 2 is a side view in elevation of the quarter frame end dump trailer in the raised or dump position.

Referring now specifically to FIGS. 1–3, the quarter frame end dump trailer of the present invention has a subframe 2 mounted on wheels 4. A trailer body 6 is secured to the rear of the subframe by hinges or pivots 8 so that the trailer may be raised and lowered by a hydraulic cylinder 10 located at the front of the trailer. A draft arm assembly 12 extends from hinges 16 and 18 and in the down position is approximately parallel to the bottom of the trailer body. The forward end of the draft arm assembly and the lower end of the hydraulic cylinder are pivotally connected by pin to a coupler plate 20 which engages the trailer with a truck. The hydraulic cylinder 10 is collapsed in the down position so that all but the lowermost segment 10A of the cylinder have retracted into the segment 10A. The segment 10A lies within the hoist housing 22 in an approximate vertical position when the trailer is in the down position.

A drag link 24 is pivotally secured to the draft arm assembly and extends to hinged supports 26 and 28. These supports hang from a cross member 25 which spans between the subframe longitudinals near the front of the subframe. The drag link is composed of two telescoping members 24A and 24B. Drag link cross members 27 and 29 are rigidly secured to the drag link longitudinals. A spring 30 extends between cross members 27 and 29 so as to control axial displacement between the telescoping ends of the drag link. Thus, when the drag link members are placed in compression due to the aforementioned imperfect geometry of the mechanical linkage, the spring allows controlled axial displacement in the drag link thereby minimizing the forces that in the absence of the present invention would result in unacceptably large and heavy components in the drag link, the draft arm assembly and the subframe.

In a preferred embodiment of the present invention for use with a 37 foot quarter frame end dump trailer, the draft arm assembly 12 at its points of attachment to the trailer body 6 is approximately 79 inches wide and at the point of attachment to the coupler plate 20 is approximately 29 inches wide. The drag link is hinged to a cross member 34 which is part of the draft arm assembly and spans between the draft arms where the latter are approximately 60 inches apart. The spring 30 has in this instance a spring constant of approximately 6000 lbs./in.

As previously indicated, when a quarter frame end dump trailer with an air ride suspension moves through its dump cycle it tends, as a result of the imperfect geometry of the linkage, to exert great forces on the components making up the linkage. The coil spring allows the drag link to change in length as the trailer moves through the dump cycle, thereby enabling the respective paths of the end of the drag link and the connection point on the draft arm assembly to coincide. While allowing this improved geometry, it also transmits a sufficient amount of downward force to the front of the subframe to prevent it from rising. Such not only permits air ride suspensions to be used but permits air ride suspensions to be used with various multiple axle configurations, an important consideration in many bridge law applications.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A quarter frame end dump trailer comprising a subframe having front and back ends, a trailer body having a front end and a dump end pivoted to the back end of the subframe, a telescoping hydraulic cylinder having one end pivotally attached to the trailer body adjacent the front end of the trailer body, a coupler plate secured to a stable location separate from the trailer body, a draft arm assembly having parallel arms extending from a region of the trailer body between its front and dump ends and pivotally attached to the coupler plate remote from the point of attachment to the trailer body, at least one resilient member, an air ride suspension, and a pair of drag links each having one end pivotally secured to the front end of the subframe, the other end secured to a predetermined location on a different one of said arms of said draft arm assembly; and each said drag link having in line first and second sections movable relative to each other to permit a change in the length of the drag link between the draft arm assembly and the subframe, said resilient member extending between said first and second sections of said drag link to resist reduction in length of said drag link.

2. A quarter frame end dump trailer according to claim 1 wherein said resilient member is at least one coil spring.

3. A quarter frame end dump trailer according to claim 2 wherein said at least one coil spring is a compression spring.

4. A quarter frame end dump trailer according to claim 1 wherein said two sections of drag link are telescoping sections, and said resilient member is a single resilient member located to bias said telescoping sections apart.

5. A quarter frame end dump trailer according to claim 4 wherein said drag link comprises two parallel drag links lying in a common plane, a first member extends transversely between parallel links of said first sections of said drag links, a second member extends transversely between parallel links of said second sections of said drag links, and said resilient member is compressible and extends between said first and second members.

6. A quarter frame end dump trailer comprising a subframe having front and back ends, a trailer body having a front end and a dump end pivoted to the back end of the subframe, a telescoping hydraulic cylinder having one end pivotally attached to the trailer body adjacent the front end of the trailer body, a coupler plate secured to a stable location separate from the trailer body, a draft arm assembly extending from a region of the trailer body between its front and dump ends and pivotally attached to the coupler plate remote from the point of attachment to the trailer body, at least one resilient member, and a pair of drag links each having one end pivotally secured to the front end of the subframe, the other end secured to a predetermined location on said draft arm assembly; and each said drag link having in line first and second sections movable relative to each other to permit a change in the length of the drag link between the draft arm assembly and the subframe, said resilient member extending between said first and second sections of said drag link to resist reduction in length of said drag link.

7. A quarter frame end dump trailer comprising a subframe having a front end and a back end, a dump trailer body having said dump end pivoted to the back of the subframe, a coupler plate adapted to connect the trailer to a tow vehicle, a telescoping cylinder connected between the coupler plate and a front end of the dump trailer body, a draft arm assembly extending from a region between the front and dump ends of said trailer body and the coupler plate, a drag link extending from the front end of the subframe to a mid region of said draft arm assembly, said drag link having two in-line sections movable toward and away from one another disposed between said subassembly and said draft arm, and resilient means for resisting the axial movement of said two sections toward one another.

* * * * *